United States Patent
Fantoni

[15] 3,640,147
[45] Feb. 8, 1972

[54] TOOLHOLDER ASSEMBLY FOR MACHINE TOOL

[72] Inventor: Giuseppe Fantoni, Ivrea, Italy

[73] Assignee: Ing. C. Olivetti & C., S.p.A., Ivrea Turin, Italy

[22] Filed: Mar. 2, 1970

[21] Appl. No.: 15,491

[30] Foreign Application Priority Data

Mar. 3, 1969 Italy..................................50820 A/69

[52] U.S. Cl. ..........................................74/424.8 R, 74/441
[51] Int. Cl.........................................F16h 1/18, F16h 55/18
[58] Field of Search........................74/424.8 R, 441, 424.8 A

[56] References Cited

UNITED STATES PATENTS

| | | |
|---|---|---|
| 2,869,403 | 1/1959 | Bent..............................74/424.8 R X |
| 2,791,922 | 5/1957 | Robinson................................77/34.4 |
| 3,369,422 | 2/1968 | Sears................................74/424.8 R |
| 3,479,897 | 11/1969 | Holthofer..............................74/441 |

*Primary Examiner*—Leonard H. Gerin
*Attorney*—Birch, Swindler, McKie & Beckett

[57] ABSTRACT

In a device for feeding a quill of machine tool, which is slidable axially in a support, the quill is threaded externally and cooperates with a lead nut rotatable concentrically with respect to the quill and is integral with a gear rotatable to effect the advance of the quill. The lead nut comprises two parts which are spaced axially by a flexible annular plate formed between an internal groove and an adjacent external groove in the lead nut to permit axial adjustment of the two parts. The lead nut includes two independent ball circulation circuits one for each one of the two parts respectively. The quill is mounted in the support by means of two elastic bushes spaced from one another and adjustable axially by means of a pressure collar to eliminate axial play of the quill.

7 Claims, 2 Drawing Figures

PATENTED FEB 8 1972

3,640,147

INVENTOR.
GIUSEPPE FANTONI

TOOLHOLDER ASSEMBLY FOR MACHINE TOOL

BACKGROUND OF THE INVENTION

1. Field of the invention

The present invention relates to a toolholder assembly with an operating device for feeding a spindle holder for a machine tool wherein the spindle is adapted to house a tool and is rotatable in the holder.

2. Description of the prior art

In machine tools, the spindle holder is normally caused to advance by means of a pinion meshing with a rack fixed to, or integral with, the holder. The pinion is therefore subjected to a heavy pressure which is applied eccentrically with respect to the holder.

An operating device for feeding a holder has also been proposed in which the holder, fixed by means of a collar and a sleeve to a lead screw cooperating with a screw arranged parallel thereto, is alongside the spindle. This operating device has the disadvantage that the axial thrust is not located on the axis of movement and, therefore, the screw is subjected to bending stresses which tend to damage the screw itself and the holder. All the known devices moreover require complicated systems for eliminating backlash.

SUMMARY OF THE INVENTION

These drawbacks are obviated by the present invention, which provides a toolholder assembly with an operating device for feeding a spindle holder for a machine tool, wherein the spindle is adapted to house a tool and is rotatable in the spindle holder, which is in turn slidable axially in a support, the spindle holder being threaded externally and cooperating with a lead nut rotatable concentrically with respect to the spindle holder in the support, a gear integral with the lead nut being adapted to rotate to effect the advance of the spindle holder.

Preferably the lead nut is of the ball circulation type and includes two independent circulation circuits disposed in two axially spaced parts of the lead nut, the lead nut having between these parts an internal groove and an adjacent external groove, a thin flexible annular plate remaining between the grooves for permitting axial adjustment of the two parts relative to each other.

The following description of a preferred embodiment of the invention is given by way of example, with the aid of the accompanying drawings.

DESCRIPTION OF THE PREFERRED EMBODIMENTS

Figure 1:
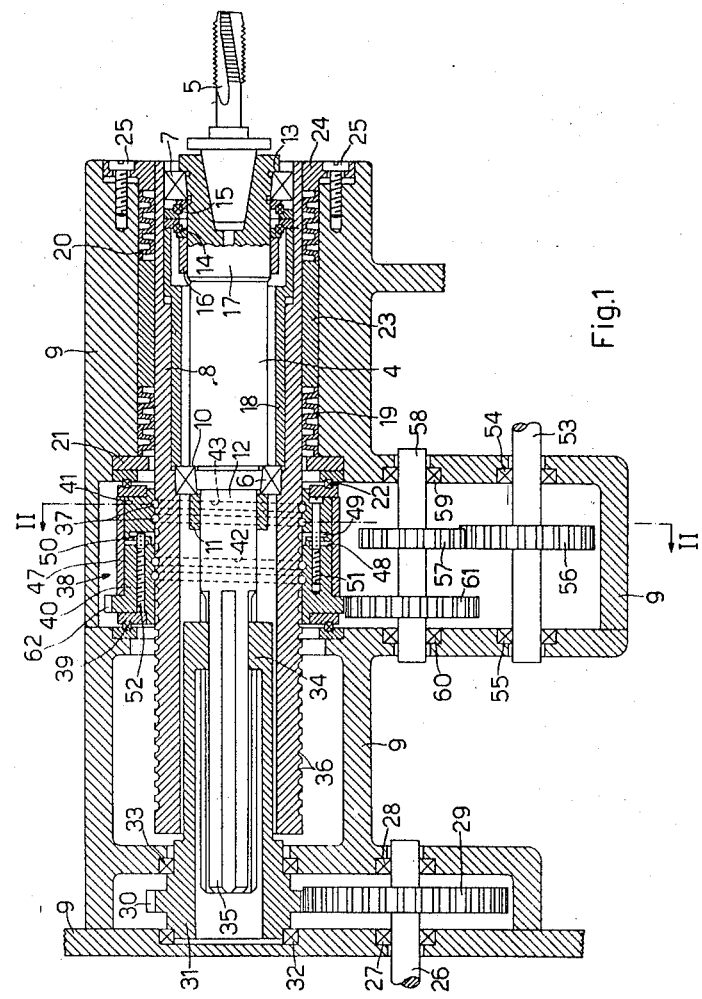
FIG. 1 is a longitudinal section of an assembly embodying the invention.

Referring to FIG. 1, the toolholder assembly includes a spindle 4 in which a tool 5 can be fixed. The spindle 4 is rotatable in two ball bearings 6 and 7 in a holder 8 slidable axially in a support 9 for the spindle head. The ball bearing 6 is held against a shoulder 10 of the spindle 4 by a ring 11 driven cold on to a portion 12 of the spindle 4. The bearing 7 is held against a shoulder 13 of the spindle 4 by two thrust bearings 14 and 15 forced towards the shoulder 13 by means of a ring 16 driven cold on to another portion 17 of the spindle 4. A spacer 18 housed in the holder 8 is interposed between the bearings 6 and 14.

The holder 8 is guided in the support 9 by means of two adjustable elastic bushes 19 and 20. The bush 19 is arranged in the support 9 in contact with a ring 21 which abuts against a thrust bearing 22. A spacer 23 is interposed between the bush 19 and the bush 20, which latter is held by a flange 24 fixed to the end of the support 9 by means of four screws 25. The pressure exerted by means of the screws 25 compresses the elastic bushes 19 and 20 axially, thus expanding them radially and eliminating radial play between the holder 8 and the bushes themselves.

The rotation of the spindle 4 is produced by a shaft 26 rotatable in two ball bearings 27 and 28 mounted in the support 9, this shaft being connected to a motor not shown in the drawing. On the shaft 26 there is fixed a gear 29 in mesh with a pinion 30 integral with a sleeve 31. This sleeve is rotatable in two ball bearings 32 and 33 mounted in the support 9 and is integral with an internally splined portion 34 which engages with a splined tail portion 35 of the spindle 4.

Figure 2:
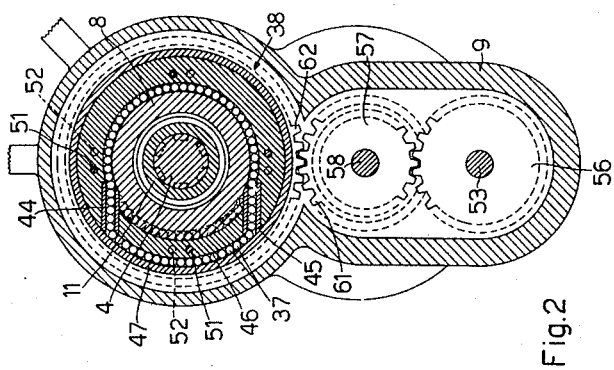
FIG. 2 is a section on the line II—II of FIG. 1.

The holder 8 is externally cylindrical and has for a certain length a thread 36 the groove of which can cooperate with a series of balls 37 circulating in a lead nut 38. This lead nut is rotatable within the support 9 between two thrust bearings 22 and 39. The lead nut 38 comprises two parts 40 and 41 which are spaced axially and provided internally with two corresponding threads 42 and 43 of equal pitch but separated from each other. The beginning and the end of each of the threads 42 and 43 are connected by two separate circulation circuits, only one of which can be seen in FIG. 2. Each of these circuits comprises two radial passages 44 and 45 and a helical passage 46 which are formed in the body of the lead nut 38 and closed by a sleeve 47 embracing the lead nut 38.

Between the two parts 40 and 41, the lead nut 38 is moreover provided with an external groove 48 (FIG. 1) and an internal groove 49. A thin annular plate 50 is left between the grooves and is flexible for permitting relative axial adjustment of the two threads 42 and 43. For this adjustment there are provided four screws 51, which are screwed into the part 40 of the lead nut 38 through the part 41 and an equal number of holes in the plate 50. Another four screws 52 can be screwed into the part 40 so as to bear against the side of the part 41.

During the fitting of the holder, the adjustment for preloading the balls 37 and eliminating backlash between the screw 36 and the lead nut 38 is effected by first screwing in the screws 51 so as to bend the plate 50 until any play present between the lead nut 38 and the screw 36 of the holder 8 is eliminated. The screws 52 are then screwed in until their ends press on the part 51 against the side of the groove 49. In this way, the screws 51 are prevented from slackening or tightening because of vibration.

The feed and return of the holder are operated through the medium of a shaft 53 rotatable in two ball bearings 54 and 55 mounted in the support 9, the shaft being adapted to be rotated by an electric motor not shown in the drawing. A gear 56 fixed on the shaft 53 is in mesh with a gear 57 fast with a second shaft 58 rotatable in two ball bearings 59 and 60. Another gear 61 fixed to the shaft 58 meshes with a ring gear 62 integral with the lead nut 38.

It is therefore clear that the holder 8 is threaded externally and cooperates with a lead nut 38 rotatable concentrically with respect to the holder 8 in the fixed support 9 of the working head and that the gear 62 integral with the lead nut 38 is rotated to produce the feed of the holder, so that the action of the lead nut 38 is centered on the axis of the holder itself.

What I claim is:

1. An operating device for feeding a nonrotatable spindle holder of a machine tool including a frame, a spindle rotatable in said spindle holder and adapted to support a tool, and means for mounting said spindle holder slidable axially in said frame, the combination comprising:

a threaded portion on the external surface of said spindle holder, a lead nut rotatable on said frame concentric with said spindle holder and cooperating with said threaded portion, a gear concentrically bodily rotatable with said lead nut, rotation of said gear and said lead nut axially feeding said spindle holder, and means for rotating said gear and said lead nut independently of said spindle.

2. A device according to claim 1, further including:

elastic bushings for mounting said spindle holder on said frame, said bushing being axially spaced from one another, and a pressure collar engaging one of said bushings and adjustable axially to eliminate axial play of said spindle holder in said frame.

3. A device according to claim 1, wherein said lead nut is formed into two axially spaced portions;
by an internal groove on said lead nut, and an external groove on said lead nut adjacent to said internal groove, said grooves being located between said two portions; and
said device including a flexible annular plate formed between said grooves to join said portions and to permit axial adjustment of said two parts relative to each other.

4. A device according to claim 3, wherein said lead nut is of the ball circulation type, and includes:
two independent circulation circuits, the balls of said circuits being disposed in one of said two portions.

5. The device according to claim 4 further including:
elastic bushings for mounting said spindle holder on said frame, said bushing being axially spaced from one another, and
a pressure collar engaging one of said bushings and adjustable axially to eliminate axial play of said spindle holder in said frame.

6. A device according to claim 3, comprising:
at least one first screw crossing one of said portions and said plate and screwed on the other of said portions to effect adjustment by axially flexing said plate, and
at least one other screw also screwed on said other part and crossing said plate to bear against said one part to prevent slackening and tightening of said first screw.

7. The device according to claim 1 further including a splined portion integral with said spindle;
a drive member, rotatably supported in said frame;
said drive member having an aperture configured congruent with said splined portion and slidably receiving said splined portion so that rotation of said drive member effects rotation of said spindle while permitting axial movement of said spindle with respect to said frame.

* * * * *